(12) United States Patent
Leverett et al.

(10) Patent No.: US 7,424,497 B1
(45) Date of Patent: Sep. 9, 2008

(54) TECHNIQUE FOR ACCELERATING THE CREATION OF A POINT IN TIME PREPRESENTATION OF A VIRTUAL FILE SYSTEM

(75) Inventors: Bruce W. Leverett, Pittsburgh, PA (US); Richard P. Jernigan, IV, Ambridge, PA (US); Jason S. Bertschi, Pittsburgh, PA (US); Narayana R. Tummala, Gibsonia, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 441 days.

(21) Appl. No.: 11/075,953

(22) Filed: Mar. 8, 2005

Related U.S. Application Data

(60) Provisional application No. 60/647,688, filed on Jan. 27, 2005.

(51) Int. Cl.
*G06F 12/00* (2006.01)
(52) U.S. Cl. .................. 707/204; 707/200; 707/205; 711/161; 711/162
(58) Field of Classification Search ................ 707/102, 707/1, 200, 204, 205; 711/114, 147, 152, 711/161, 162
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,570,217 A | 2/1986 | Allen et al. | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,989,206 A | 1/1991 | Dunphy, Jr. et al. | |
| 5,124,987 A | 6/1992 | Milligan et al. | |
| RE34,100 E | 10/1992 | Hartness | |
| 5,155,835 A | 10/1992 | Belsan | |
| 5,163,131 A | 11/1992 | Row et al. | |

(Continued)

FOREIGN PATENT DOCUMENTS

WO    WO 89/10594    11/1989

OTHER PUBLICATIONS

Chutani et al., The Episode File System, Proceedings of the USENIX Winter 1992 Technical Conference with updated p. 5, 19 pages.*

(Continued)

*Primary Examiner*—Pierre M. Vital
*Assistant Examiner*—Edward J Kennedy
(74) *Attorney, Agent, or Firm*—Cesari and McKenna, LLP

(57) ABSTRACT

A technique for accelerating the creation of a hyperclone of a virtual file system. A hyperclone inode is copied from the base inode. Each indirect and direct block referenced by the base inode is also copied and the block pointers within the base inode are set to reference the copied direct data blocks. A CTW bit is set within each copied block that alerts the file system that the reference indirect or direct block is not to be deallocated.

52 Claims, 12 Drawing Sheets

U.S. PATENT DOCUMENTS

| | | | |
|---|---|---|---|
| 5,202,971 A * | 4/1993 | Henson et al. | 707/8 |
| 5,202,979 A | 4/1993 | Hillis et al. | |
| 5,278,979 A | 1/1994 | Foster et al. | |
| 5,426,747 A | 6/1995 | Weinreb et al. | |
| 5,581,724 A | 12/1996 | Belsan et al. | |
| 5,761,678 A * | 6/1998 | Bendert et al. | 707/204 |
| 5,819,292 A * | 10/1998 | Hitz et al. | 707/203 |
| 6,341,341 B1 * | 1/2002 | Grummon et al. | 711/162 |
| 6,636,878 B1 * | 10/2003 | Rudoff | 707/204 |
| 6,636,879 B1 | 10/2003 | Doucette et al. | |
| 6,671,773 B2 * | 12/2003 | Kazar et al. | 711/112 |
| 6,868,417 B2 * | 3/2005 | Kazar et al. | 707/10 |
| 6,895,591 B1 * | 5/2005 | Russ et al. | 719/332 |
| 6,938,135 B1 * | 8/2005 | Kekre et al. | 711/162 |
| 7,024,427 B2 * | 4/2006 | Bobbitt et al. | 707/200 |
| 7,072,916 B1 * | 7/2006 | Lewis et al. | 707/205 |
| 7,206,819 B2 * | 4/2007 | Schmidt | 709/214 |
| 2005/0004925 A1 * | 1/2005 | Stahl et al. | 707/100 |
| 2005/0033748 A1 * | 2/2005 | Kazar et al. | 707/10 |
| 2006/0123211 A1 * | 6/2006 | Derk et al. | 711/162 |

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.
Bitton, Dina, *Disk Shadowing*, Proceedings of the 14th VLDB Conference, LA, CA 1988.
Chaudhuri, Surajit, et al., *Self-Tuning Technology in Microsoft SQL Server*, Data Engineering Journal 22, Feb. 1999 pp. 20-27.
Chutani, Sailesh, et al., *The Episode File System*, In Proceedings of the USENIX Winter 1992.
Coyne, Robert A., et al., *Storage Systems for National Information Assets*, Proc. Supercomputing 92, Minneapolis, Nov. 1992, pp. 626-633.
Finlayson, Ross S., et al., *Log Files: An Extended File Service Exploiting Write-Once Storage* Department of Computer Science, Stanford University, Report No. STAN-CS-87-1177, Sep. 1987.
Gray, Jim, et al., *The Recovery Manager of the System R Database Manager*, ACM Computing Surveys, (13)2:223-242 1981.
Hecht, Matthew S., et al. *Shadowed Management of Free Disk Pages with a Linked List*, ACM Transactions on Database Systems, 8/4, Dec. 1983, pp. 503-514.
Howard, John, H. et al., *Scale and Performance in a Distributed File System*, Carnegie Mellon University, CMU-ITC-87-068, Aug. 1987.
Howard, John H., *An Overview of the Andrew File System*, Carnegie Mellon University, CMU-ITC-88-062 1988.
Howard, John, H. et al., *Scale and Performance in a Distributed File System*, ACM Trans. Computer System, 6(1), Feb. 1988 pp. 51-81.
Kazar, Michael Leon, *Synchronization and Caching Issues in the Andrew File System*, Carnegie Mellon University, CMU-ITC-88-063.
Kazar, Michael L., et al., *DEcorum File System Architectural Overview*, USENIX Summer Conference, Anaheim, California, 1990.
Kemper, Alfons, et al., *Performance Tuning for SAP R/3*, Data Engineering Journal 22, Feb. 1999 pp. 33-40.
Kent, Jack et al., *Optimizing Shadow Recovery Algorithms*, IEEE Transactions on Software Engineering, 14(2): 155-168, Feb. 1988.
Kistler, et al., *Disconnected Operation in the Coda File System*, ACM Transactions on Computer Systems, vol. 10, No. 1, Feb. 1992, pp. 3-25.
Lorie, Raymond, A. *Physical Integrity in a Large Segmented Database*, ACM Trans. Database Syst., vol. 2, Mar. 1977, pp. 91-104.
Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.
Patterson, D., et al., *A Case for Redundant Arrays of Inexpensive Disks (RAID),* Technical Report, CSD-87-391, Computer Science Division, Electrical Engineering and Computer Sciences, University of California at Berkeley 1987.
Patterson, D., et al., *A Case for Redundant Arrays of Inexpensive Disks (RAID),* SIGMOD International Conference on Management of Data, Chicago, IL, USA, Jun. 1-3, 1988, SIGMOD RECORD (17)3:109-16 Sep. 1988.
Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.
Quinlan, Sean, *A Cached WORM File System*, Software-Practice and Experience, 21(12):1289-1299 1991.
Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.
Rosenblum, Mendel, et al. *The Design and Implementation of a Log-Structured File System* Jul. 24, 1991 pp. 1-15.
Rosenblum, Mendel, *The Design and Implementation of a Log-Structured File System*, 1992 pp. 1-93.
Rosenblum, Mendel, et al., *The Design and Implementations of a Log-Structured File System,*, In Proceedings of ACM Transactions on Computer Systems, (10)1:26-52, Feb. 1992.
Schiefer, Berni, et al., *DB2 Universal Database Performance Tuning*, Data Engineering Journal 22, Feb. 1999 pp. 12-19.
Seltzer, Margo I., et al., *Journaling Versus Soft Updates: Asynchronous Meta-Data Protection in File Systems*, Proceedings of 200 USENIX Annual Technical Conference, Jun. 18-23, 2000.
Shasha, Dennis, *Tuning Time Series Queries in Finance: Case Studies and Recommendations*, Data Engineering Journal 22, Feb. 1999 pp. 41-47.
Sidebotham, Bob, *Volumes: The Andrew File System Data Structuring Primitive*, EEUG Conference Proceedings, Manchester, UK, Autumn 1986.
Subramanian, Muralidhar, et al., *Performance Challenges in Object-Relational DBMSs*, Data Engineering Journal 22, Feb. 1999 pp. 28-32.
Weikum, Gerhard, et al., *Towards Self-Tuning Memory Management for Data Servers*, Data Engineering Journal 22, Feb. 1999 pp. 3-11.
West, Michael, et al. *The ITC Distributed File System: Prototype and Experience*, Carnegie-Mellon University, Technical Report CMU-ITC-040, Mar. 1985.
Zayas, Edward R., AFS-3 Programmer's Reference: Architectural Overview, Transarc Corporation, Pittsburgh, PA, 1.0 edition 1991.
Administration Guide found at http://www.openafs.org/pages/doc/AdminGuide/auagd010.htm, visited on Mar. 2, 2005.
Basilico, et al., *Error Correction System Using "Shadow Memory,"* IBM Technical Disclosure Bulletin, May 1984, pp. 5792-5793.
Bitton, Dina, *Disk Shadowing*, Proceedings of the 14th VLDB Conference, LA, CA (1988).
Blasgen, M.W. et al., *System R:An architectural Overview*,Reprinted from IBM Systems Journal vol. 20, No. 1, 1981© 1981, 1999.
Borenstein, Nathaniel S., *CMU's Andrew project a retrospective*, Communications of ACM, (39)12, Dec. 1996.
Brown, Mark R. et al., *The Alpine file system*, ACM Transactions on Computing Systems, 3(4):261-293, Nov. 1985.
Chen, Peter M., et al.,*An Evaluation of Redundant Arrays of Disks Using an Amdahl 5890* Performance Evaluation, pp. 74-85, 1990.
Clark, B.E., et al., *Application System /400 Performance Characteristics*, IBM Systems Journal, 28(3): 407-423, 1989.
Data Sheet for the Check Point Software Technologies product Flood-Gate-I (1997).
Dibble, Peter C., et al., Beyond Striping: The Bridge Multiprocessor File System, Computer Science Department, University of Rochester, Aug. 11, 1989.
Douglis, Fred, et al., *A comparison of two distributed systems: Amoeba and Sprite*—Computing Systems, 4(4), Fall 1991, pp. 353-385 ?{copy of article I have has no date or cite}.
Gait, Jason, *Phoenix: A Safe In-Memory File System*. Communications of the ACM, 33(1):81-86, Jan. 1990.
Hartman, John H. et al., *Performance Measurements of a Multiprocessor Sprite Kernel*, Proceedings of the USENIX Conference, 1990.
Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John H., *An Overview of the Andrew File System*, Carnegie Mellon University, CMU-ITC-88-062.

*The IBM System/38*, Chapter 8, pp. 137-15.

Isomaki, Markus, *Differentiated Service for the Internet*, Department of Technical Physics and Mathematics, May 9, 1998.

Lomet, David, et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1: 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12th IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-57.

Ousterhout, John K. et al., *The Sprite Network Operating System*, Computer Science Division, Department of Electrical Engineering and Computer Sciences, Univ. of CA, Berkley, Nov. 19. 1987.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www.cs.berkeley.edu/projects/sprite/retrospective.html,visited on Mar. 11, 2005.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al., The *Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al., *Coda: A highly available file system for a distributed workstation environment* Carnegie Mellon University, CMU-ITC.

Satyanarayanan, M., et al., *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

\* cited by examiner

TECHNIQUE FOR ACCELERATING THE CREATION OF A POINT IN TIME PREPRESENTATION OF A VIRTUAL FILE SYSTEM

CROSS-REFERENCE TO RELATED APPLICATION

The present application claims the benefit of U.S. Provisional Patent Application Ser. No. 60/647,688 which was filed on Jan. 27, 2005, by Bruce W. Leverett et al. for a TECHNIQUE FOR ACCELERATING THE CREATION OF A POINT IN TIME PREPRESENTATION OF A VIRTUAL FILE SYSTEM and is hereby incorporated by reference.

FIELD OF THE INVENTION

The present invention is directed to file systems and, in particular to accelerating the creation of point in time images of a virtual file system.

BACKGROUND OF THE INVENTION

A storage system is a computer that provides storage service relating to the organization of information on storage devices, such as disks. The storage system may be deployed within a network attached storage (NAS) environment and, as such, may be embodied as a file server. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages to the filer over the network.

A common type of file system is a "write-in-place" file system, an example of which is the conventional Berkeley fast file system. In a write-in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write-in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the SpinFS file system available from Network Appliance, Inc. of Sunnyvale, Calif. The SpinFS file system utilizes a write anywhere technique for user and directory data but writes metadata in place. The SpinFS file system is implemented within a storage operating system having a protocol stack and associated disk storage.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume may be organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. As described herein, a volume typically comprises at least one data disk and one associated parity disk (or possibly data/parity) partitions in a single disk) arranged according to a RAID 4, or equivalent high-reliability, implementation. In other examples, disk storage may be organized in non-RAID configurations including, for example, just a bunch of disks (JBOD). As such, the description of RAID should be taken as exemplary only.

A common feature of a write-anywhere file systems is the ability to create a point in time image of a data container, such as a file system or some subset thereof. One example of the creation of point in time persistent images is described in U.S. Pat. No. 5,819,292, entitled, METHOD FOR MAINTAINING CONSISTENT STATES OF A FILE SYSTEM AND FOR CREATING USER-ACCESSIBLE READ-ONLY COPIES OF A FILE SYSTEM, by David Hitz et al, the contents of which are hereby incorporated by reference. Another example of the creation of point-in-time persistent images of a file system (a "clone") is a conventional cloning process utilized in file systems, such as the exemplary Spin FS file system available from Network Appliance, Inc. In the Spin FS file system, disk storage is organized into storage pools, which are further divided into virtual file systems (VFS). Each VFS contains, at its top level, a VFS inode that includes pointers to additional data blocks containing inodes and to indirect blocks that, in turn, reference additional data blocks containing inodes. These inodes are, in turn, the top-level data structures of individual files and/or directories within the VFS.

The conventional cloning process for use with the Spin FS File System is described in U.S. Pat. No. 6,868,417, issued on Mar. 15, 2005 entitled, MECHANISM FOR HANDLING FILE LEVEL AND BLOCK LEVEL REMOTE FILE ACCESSES USING THE SAME SERVER, by Michael L. Kazar, et al, the contents of which are hereby incorporated by reference. Here, when a VFS is cloned, all inodes in the VFS are copied to create the clone, including all indirect blocks pointing to (referencing) inodes. These inode blocks referenced by the VFS inode comprise an inode file describing the VFS. The inode file comprises a plurality of inodes, each of which represents a file or directory. A VFS may contain a very large number (e.g., millions or billions) of individual files. Accordingly, the time required to copy each inode of a file (and/or directory) during the cloning process may be on the order of tens of seconds, during which time the file data is inaccessible by clients. Loss of data access for such a relatively long period of time (e.g., tens of seconds) is undesirable, especially in systems wherein a clone is created on a regular basis, e.g., every hour.

SUMMARY OF THE INVENTION

The present invention overcomes the disadvantages of the prior art by providing a technique for accelerating the creation of a point-in-time representation of a virtual file system (VFS), hereinafter referred to as a "hyperclone" VFS of a storage system. Instead of copying inodes associated with the VFS when creating the point-in-time representation, the novel hypercloning technique generates only a copy of a base VFS inode, which represents a top-level data structure of the base VFS. Data blocks that are directly referenced by the base VFS inode are also copied and direct block pointers within the base VFS inode are modified to reference the copied data blocks. Any indirect block pointers within the hyperclone VFS inode are not modified and, thus, continue to reference indirect blocks. The base VFS inode is modified to point to the copied indirect blocks.

Additionally, a flag in the copies of the indirect and direct blocks, is asserted that alerts a file system executing in the storage system that the referenced indirect or direct block is not to be deallocated. This flag, which in the exemplary embodiment is a copy tree on write (CTW) bit, indicates that the associated data structure (direct or indirect block) is shared with one or more other VFS's within a storage pool of the system. Association of the CTW bit prevents the file system from freeing the direct/indirect block referenced by the inode. Thus, if a data block is modified, the file system writes a new block to disk and updates the pointer in the base VFS inode. When this new block is written to disk, the CTW bit within the block pointer is cleared. The original data block continues to be referenced by the hyperclone VFS inode.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
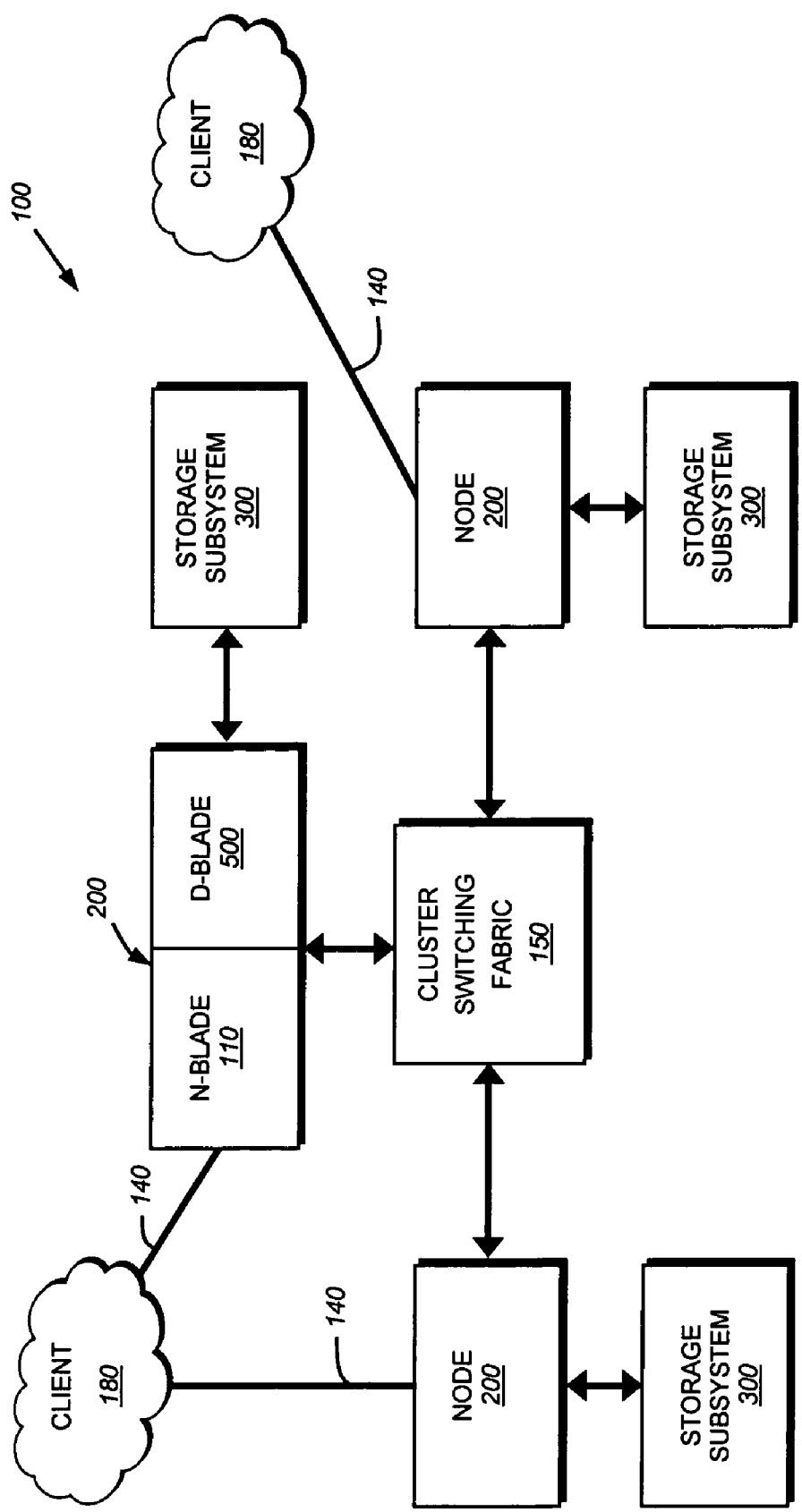
FIG. 1 is a schematic block diagram of a plurality of nodes interconnected as a cluster that may be advantageously used with the present invention.

FIG. 1 is a schematic block diagram of a plurality of nodes 200 interconnected as a cluster 100 and configured to provide storage service relating to the organization of information on storage devices of a storage subsystem. The nodes 200 comprise various functional components that cooperate to provide a distributed Spin File System (SpinFS) architecture of the cluster 100. To that end, each SpinFS node 200 is generally organized as a network element (N-blade 110) and a disk element (D-blade 500). The N-blade 110 includes a plurality of ports that couple the node 200 to clients 180 over a computer network 140, while each D-blade 500 includes a plurality of ports that connect the node to a storage subsystem 300. The nodes 200 are interconnected by a cluster switching fabric 150 which, in the illustrative embodiment, may be embodied as a Gigabit Ethernet switch. The distributed SpinFS architecture is generally described in U.S. Pat. No. 6,671,773, issued on Dec. 30, 2003 titled, Method and System for Responding to File System Requests, by M. Kazar et al. published Aug. 22, 2002.

B. Storage Systems

Figure 2:
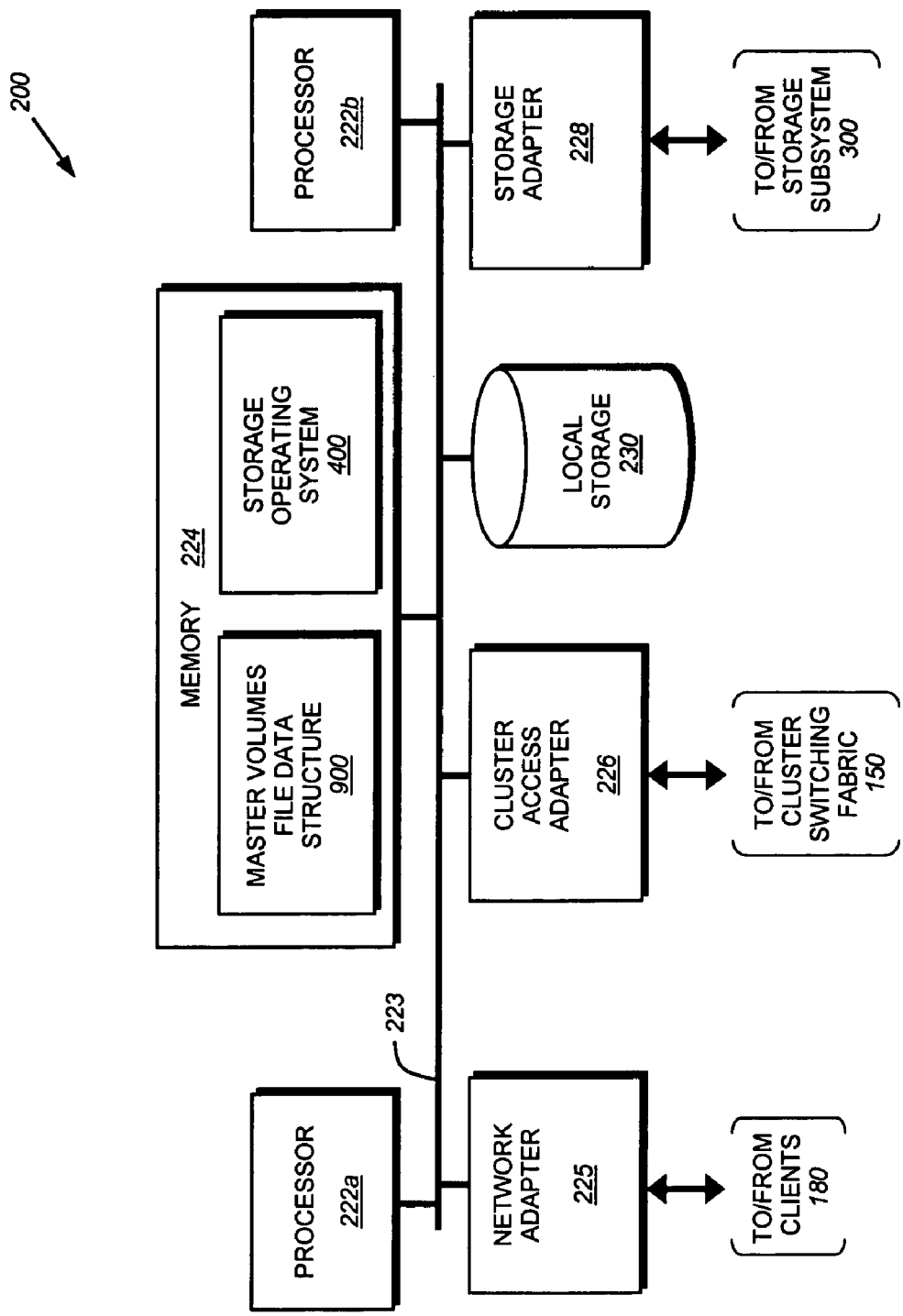
FIG. 2 is a schematic block diagram of a node that may be advantageously used with the present invention.

FIG. 2 is a schematic block diagram of a node 200 that is illustratively embodied as a storage system server comprising a plurality of processors 222, a memory 224, a network adapter 225, a cluster access adapter 226, a local storage 230 and a storage adapter 228 interconnected by a system bus 223. The local storage 230 is utilized by the node to store local configuration information (i.e. management data), including its local copy of a replicated database (RDB) 850 (see FIG. 8). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein.

Each node 200 is illustratively embodied as a dual processor server system executing a storage operating system 400 that provides a file system configured to logically organize the information as a hierarchical structure of named directories and files on storage subsystem 300. However, it will be apparent to those of ordinary skill in the art that the node 200 may alternatively comprise a single or more than two processor system. Illustratively, one processor 222a executes the functions of the N-blade 110 on the node, while the other processor 222b executes the functions of the D-blade 500. It should be noted that a node may comprise any number of N and D-blades. As such, the description of a node having one N-blade and one D-blade should be taken as exemplary only.

In the illustrative embodiment, the memory 224 comprises storage locations that are addressable by the processors and adapters for storing software program code and data structures, such as the master volumes file data structure 900, associated with the present invention. The processor and adapters may, in turn, comprise processing elements and/or logic circuitry configured to execute the software code and manipulate the data structures. The storage operating system 400, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the inventive system and method described herein.

The network adapter 225 comprises a plurality of ports adapted to couple the node 200 to one or more clients 180 over point-to-point links, wide area networks, virtual private networks implemented over a public network (Internet) or a shared local area network, hereinafter referred to as an Ethernet computer network 140. Therefore, the network adapter 225 may comprise a network interface card (NIC) having the mechanical, electrical and signaling circuitry needed to connect the node to the network. For such a network attached storage (NAS) based network environment, the clients are configured to access information stored on the node 200 as files. The clients 180 communicate with each node over network 140 by exchanging discrete frames or packets of data according to pre-defined protocols, such as the Transmission Control Protocol/Internet Protocol (TCP/IP).

The storage adapter 228 cooperates with the storage operating system 400 executing on the node 200 to access information requested by the clients. The information may be stored on disks or other similar media adapted to store information. The storage adapter comprises a plurality of ports having input/output (I/O) interface circuitry that couples to the disks over an I/O interconnect arrangement, such as a conventional high-performance, Fibre Channel (FC) link topology. The information is retrieved by the storage adapter and, if necessary, processed by the processor 222 (or the adapter 228 itself) prior to being forwarded over the system bus 223 to the network adapter 225 where the information is formatted into packets or messages and returned to the clients.

Figure 3:
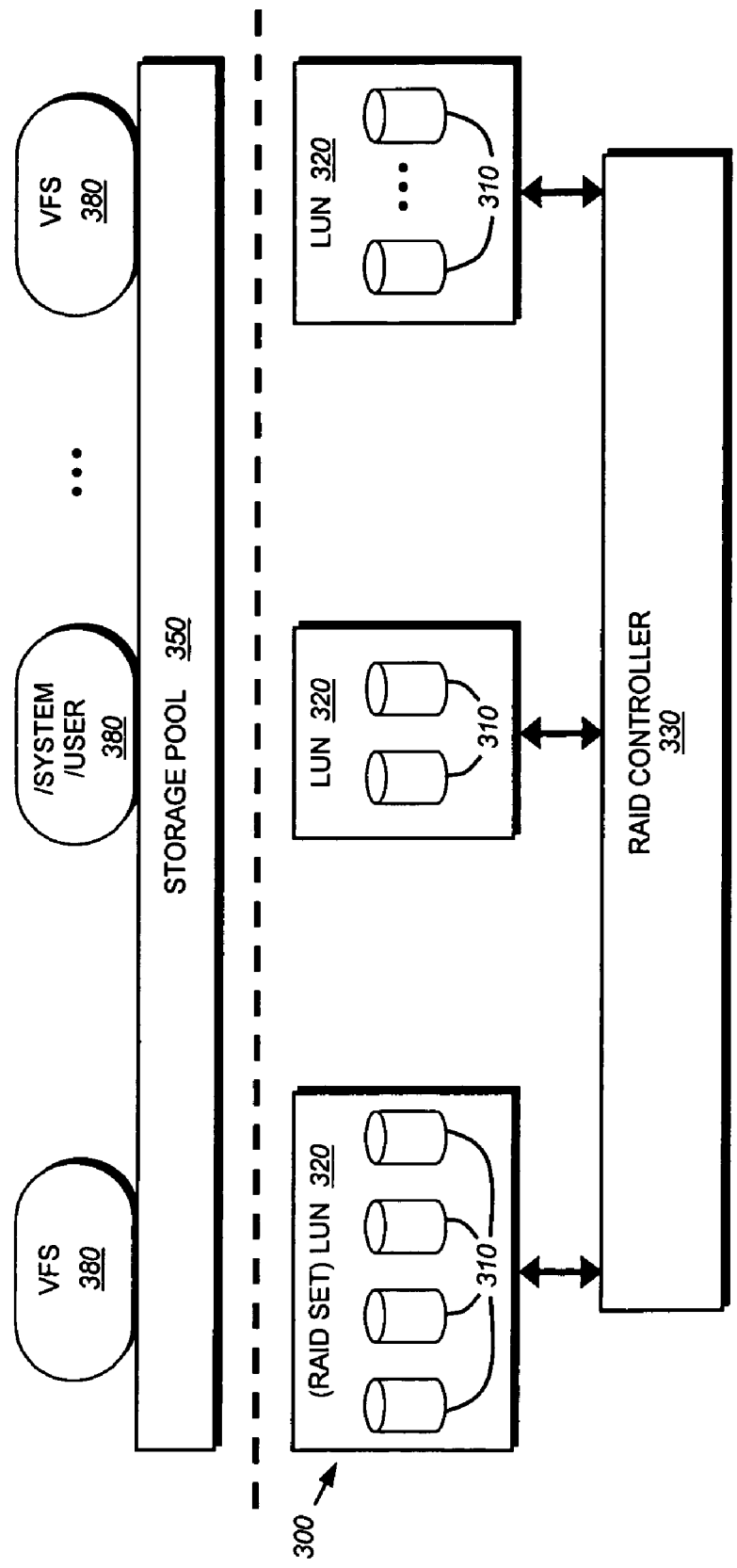
FIG. 3 is a schematic block diagram illustrating the storage subsystem that may be advantageously used with the present invention.

FIG. 3 is a schematic block diagram illustrating the storage subsystem 300 that may be advantageously used with the present invention. Storage of information on the storage subsystem 300 is illustratively implemented as a plurality of storage disks 310 defining an overall logical arrangement of disk space. The disks are further organized as one or more groups or sets of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Each RAID set is illustratively configured by one or more RAID controllers 330. The RAID controller 330 exports a RAID set as a logical unit number (LUN 320) to the D-blade 500, which writes and reads blocks to and from the LUN 320. One or more LUNs are illustratively organized as a storage pool 350, wherein each storage pool 350 is "owned" by a D-blade 500 in the cluster 100. Each storage pool 350 is further organized as a plurality of virtual file systems (VFSs 380), each of which is also owned by the D-blade. Each VFS 380 may be organized within the storage pool according to a hierarchical policy that, among other things, allows the VFS to be dynamically moved among nodes of the cluster to, for example, control load among individual storage pools.

In the illustrative embodiment, a VFS 380 is synonymous with a volume and comprises a root directory, as well as a number of subdirectories and files. A group of VFSs may be composed into a larger namespace. For example, a root directory (c:) may be contained within a root VFS ("/"), which is the VFS that begins a translation process from a pathname associated with an incoming request to actual data (file) in a file system, such as the SpinFS file system. The root VFS may contain a directory ("system") or a mount point ("user"). A mount point is a SpinFS object used to "vector off" to another VFS and which contains the name of that vectored VFS. The file system may comprise one or more VFSs that are "stitched together" by mount point objects.

C. Storage Operating System

To facilitate access to the disks 310 and information stored thereon, the storage operating system 400 (FIG. 4) implements a hybrid write-anywhere/write-in-place file system, such as the SpinFS file system, which logically organizes the information as a hierarchical structure of named directories and files on the disks. However, it is expressly contemplated that any appropriate storage operating system, including a write-in-place file system, may be enhanced for use in accordance with the inventive principles described herein. Each "on-disk" file may be implemented as set of disk blocks configured to store information, such as data, whereas the directory may be implemented as a specially formatted file in which names and links to other files and directories are stored.

As used herein, the term "storage operating system" generally refers to the computer-executable code operable on a computer that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
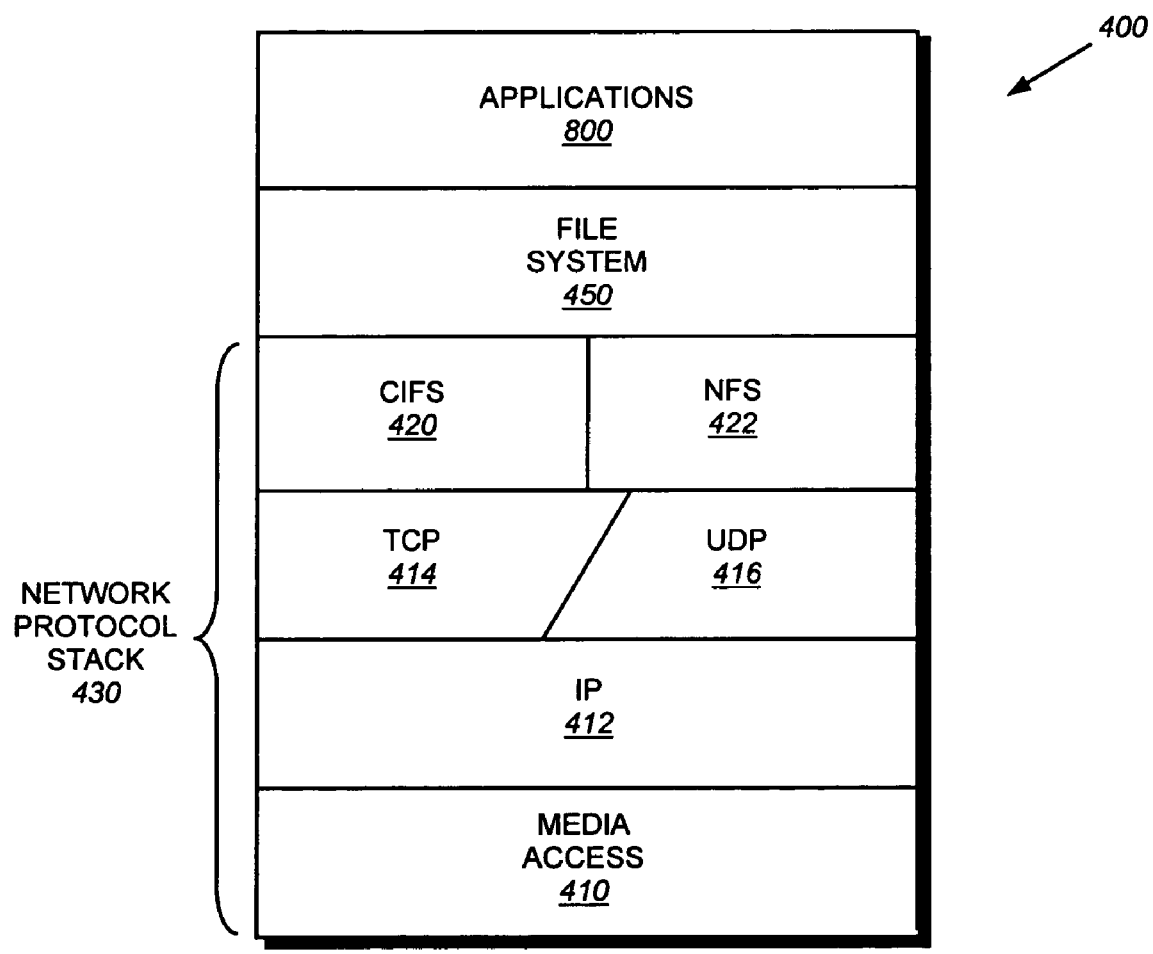
FIG. 4 is a partial schematic block diagram of a storage operating system that may be advantageously used with the present invention.

FIG. 4 is a partial schematic block diagram of the storage operating system 400 that may be advantageously used with the present invention. The storage operating system comprises a series of software layers organized to form an integrated network protocol stack 430 that provides a data path for clients to access information stored on the node 200 using file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access to a file system 450 (the SpinFS file system) and, thus, includes support for the CIFS protocol 420 and the NFS protocol 422. As described further herein, a plurality of management processes executes as user mode applications 800.

In the illustrative embodiment, the processors 222 share various resources of the node 200, including the storage operating system 400. To that end, the N-blade 110 executes the integrated network protocol stack 430 of the operating system 400 to thereby perform protocol termination with respect to a client issuing incoming NFS/CIFS file access request packets over the network 150. The NFS/CIFS layers of the network protocol stack function as NFS/CIFS servers 422, 420 that translate NFS/CIFS requests from a client into SpinFS protocol requests used for communication with the D-blade 500. The SpinFS protocol is a file system protocol that provides operations related to those operations contained within the incoming file access packets. Local communication between an N-blade and D-blade of a node is preferably effected through the use of message passing between the blades, while remote communication between an N-blade and D-blade of different nodes occurs over the cluster switching fabric 150.

D. D-Blade

Figure 5:
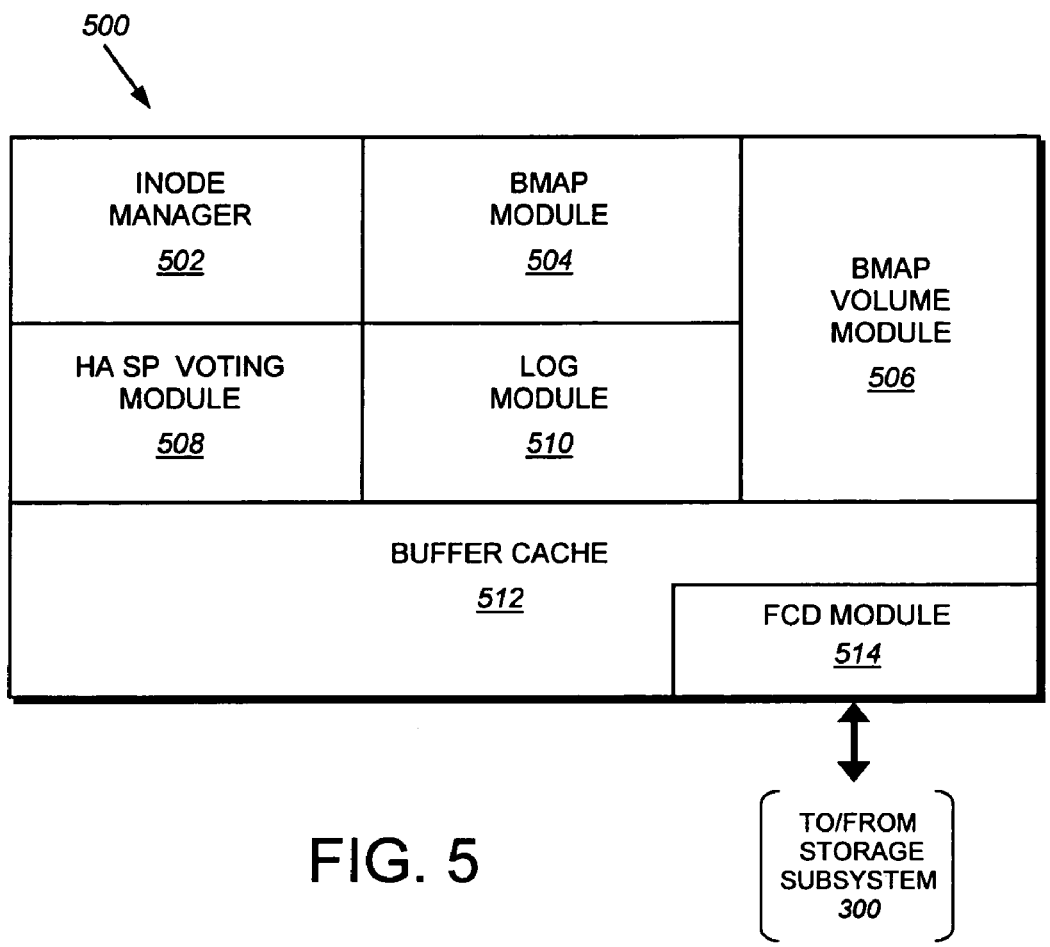
FIG. 5 is a schematic block diagram of a D-blade that may be advantageously used with the present invention.

Specifically, the NFS and CIFS servers of an N-blade 110 convert the incoming file access requests into SpinFS requests that are processed by the D-blades 500 of the cluster 100. Each D-blade 500 provides a disk interface function through execution of the SpinFS file system 450. In the illustrative cluster 100, the file systems 450 cooperate to provide a single SpinFS file system image across all of the D-blades in the cluster. Thus, any network port of an N-blade that receives a client request can access any file within the single file system image located on any D-blade 500 of the cluster. FIG. 5 is a schematic block diagram of the D-blade 500 comprising a plurality of functional components including a file system processing module (the inode manager 502), a logical-oriented block processing module (the Bmap module 504) and a Bmap volume module 506. The inode manager 502 is the processing module that implements the SpinFS file system 450, whereas the Bmap module 504 is responsible for all block allocation functions associated with a modified write in place policy or hybrid write in place/write anywhere policy of the file system 450, including reading and writing all data to and from the RAID controller 330 of storage subsystem 300. The Bmap volume module 506, on the other hand, implements all VFS operations in the cluster 100, including creating and deleting a VFS, mounting and unmounting a VFS in the cluster, moving a VFS, as well as implementing the hyper-cloning of a VFS in accordance with the present invention. The D-blade also includes a high availability storage pool (HA SP) voting module 508, a log module (manager) 510, a buffer cache 512 and a fibre channel device driver (FCD) module 514.

E. SpinFS

Figure 6:
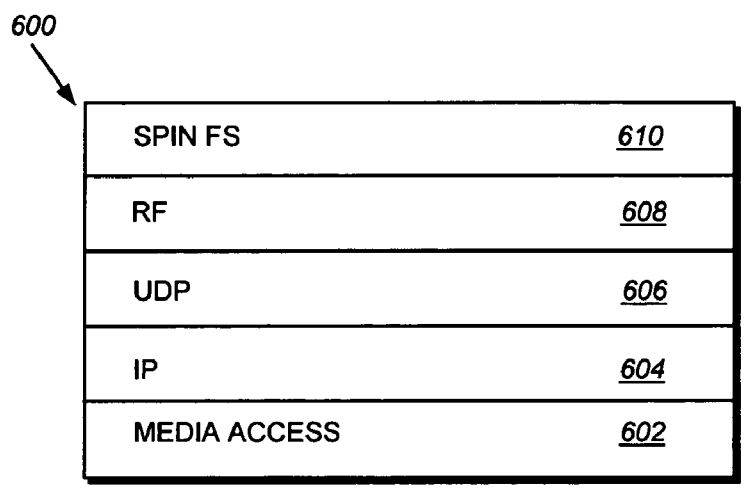
FIG. 6 is a schematic block diagram illustrating the format of a SpinFS request that may be advantageously used with the present invention.

The NFS and CIFS servers on the N-blade 110 translate respective NFS and CIFS requests into SpinFS primitive operations contained within SpinFS packets (requests). FIG. 6 is a schematic block diagram illustrating the format of a SpinFS request 600 that illustratively includes a media access layer 602, an IP layer 604, a UDP layer 606, an RF layer 608 and a SpinFS protocol layer 610. As noted, the SpinFS protocol 610 is a file system protocol that provides operations, related to those operations contained within incoming file access packets, to access files stored on the cluster 100. Illustratively, the SpinFS protocol 610 is datagram based and, as such, involves transmission of packets or "envelopes" in a reliable manner from a source (e.g., an N-blade) to a destination (e.g., a D-blade). The RF layer 608 implements a reliable transport protocol that is adapted to process such envelopes in accordance with a connectionless protocol, such as UDP 606.

Figure 7:
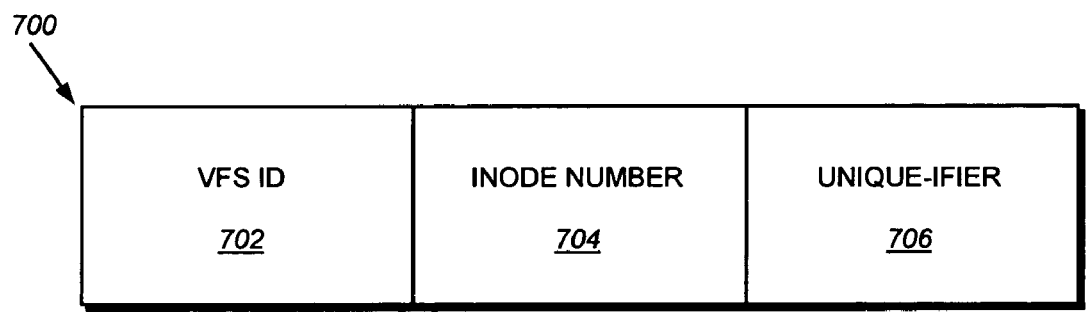
FIG. 7 is a schematic block diagram illustrating the format of a file handle that may be advantageously used with the present invention.

Files are accessed in the SpinFS file system 450 using a file handle. FIG. 7 is a schematic block diagram illustrating the format of a file handle 700 including a VFS ID field 702, an inode number field 704 and a unique-ifier field 706. The VFS ID field 702 contains an identifier of a VFS that is unique (global) within the entire cluster 100. The inode number field 704 contains an inode number of a particular inode within an inode file of a particular VFS. The unique-ifier field 706 contains a monotonically increasing number that uniquely identifies the file handle 700, particularly in the case where an inode number has been deleted, reused and reassigned to a new file. The unique-ifier distinguishes that reused inode number in a particular VFS from a potentially previous use of those fields.

Figure 8:
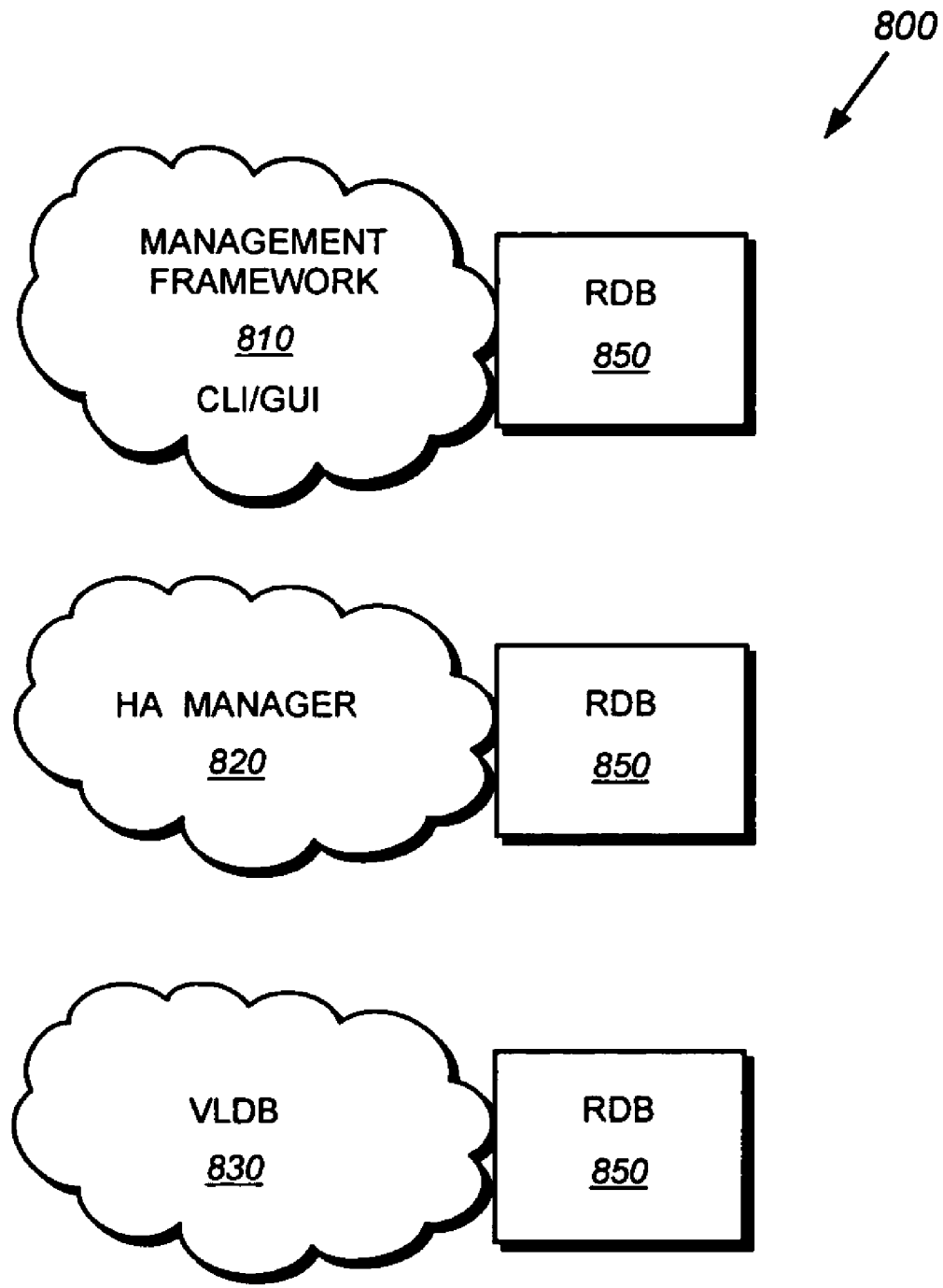
FIG. 8 is a schematic block diagram illustrating a collection of management processes that may be advantageously used with the present invention.

FIG. 8 is a schematic block diagram illustrating a collection of management processes that execute as user mode applications 800 on the storage operating system 400 to provide management of configuration information (i.e. management data) for the nodes of the cluster. To that end, the management processes include a management framework process 810, a high availability manager (HA Mgr) process 820, a VFS location database (VLDB) process 830 and a replicated database (RDB) process 850. The management framework 810 provides a user interface via a command line interface (CLI) and/or graphical user interface (GUI). The management framework is illustratively based on a conventional common interface model (CIM) object manager that provides the entity to which users/system administrators interact with a node 200 in order to manage the cluster 100.

The HA Mgr 820 manages all network addresses (IP addresses) of all nodes 200 on a cluster-wide basis. For example, assume a network adapter 225 having two IP addresses (IP1 and IP2) on a node fails. The HA Mgr 820 relocates those two IP addresses onto another N-blade of a node within the cluster to thereby enable clients to transparently survive the failure of an adapter (interface) on an N-blade 110. The relocation (repositioning) of IP addresses within the cluster is dependent upon configuration information provided by a system administrator. The HA Mgr 820 is also responsible for functions such as monitoring an uninterrupted power supply (UPS) and notifying the D-blade to write its data to persistent storage when a power supply issue arises within the cluster.

The VLDB 830 is a database process that tracks the locations of various storage components (e.g., a VFS) within the cluster 100 to thereby facilitate routing of requests throughout the cluster. In the illustrative embodiment, the N-blade 110 of each node has a look up table that maps the VFS ID 702 of a file handle 700 to a D-blade 500 that "owns" (is running) the VFS 380 within the cluster. The VLDB provides the contents of the look up table by, among other things, keeping track of the locations of the VFSs 380 within the cluster. The VLDB has a remote procedure call (RPC) interface, e.g., a Sun RPC interface, which allows the N-blade 110 to query the VLDB 830. When encountering a VFS ID 702 that is not stored in its mapping table, the N-blade sends an RPC to the VLDB process. In response, the VLDB 830 returns to the N-blade the appropriate mapping information, including an identifier of the D-blade that owns the VFS. The N-blade caches the information in its look up table and uses the D-blade ID to forward the incoming request to the appropriate VFS 380.

All of these management processes have interfaces to (are closely coupled to) a replicated database (RDB) 850. The RDB comprises a library that provides a persistent object store (storing of objects) for the management data processed by the management processes. Notably, the RDB 850 replicates and synchronizes the management data object store access across all nodes 200 of the cluster 100 to thereby ensure that this RDB database is identical (has an identical image) on all of the nodes 200. For example, the HA Mgr 820 uses the RDB library 850 to monitor the status of the IP addresses within the cluster. At system startup, each node 200 records the status/state of its interfaces and IP addresses (those IP addresses it "owns") into the RDB database.

Operationally, requests are issued by clients 180 and received at the network protocol stack 430 of an N-blade 110 within a node 200 of the cluster 100. The request is parsed through the network protocol stack to the appropriate NFS/CIFS server, where the specified VFS 380 (and file), along with the appropriate D-blade 500 that "owns" that VFS, are determined. The appropriate server then translates the incoming request into a SpinFS request 600 that is routed to the D-blade 500. The D-blade receives the SpinFS request and apportions it into a part that is relevant to the requested file (for use by the inode manager 502), as well as a part that is relevant to specific access (read/write) allocation with respect to blocks on the disk (for use by the Bmap module 504). All functions and interactions between the N-blade 110 and D-blade 500 are coordinated on a cluster-wide basis through the collection of management processes and the RDB library user mode applications 800.

F. File System Data Structure

Figure 9:
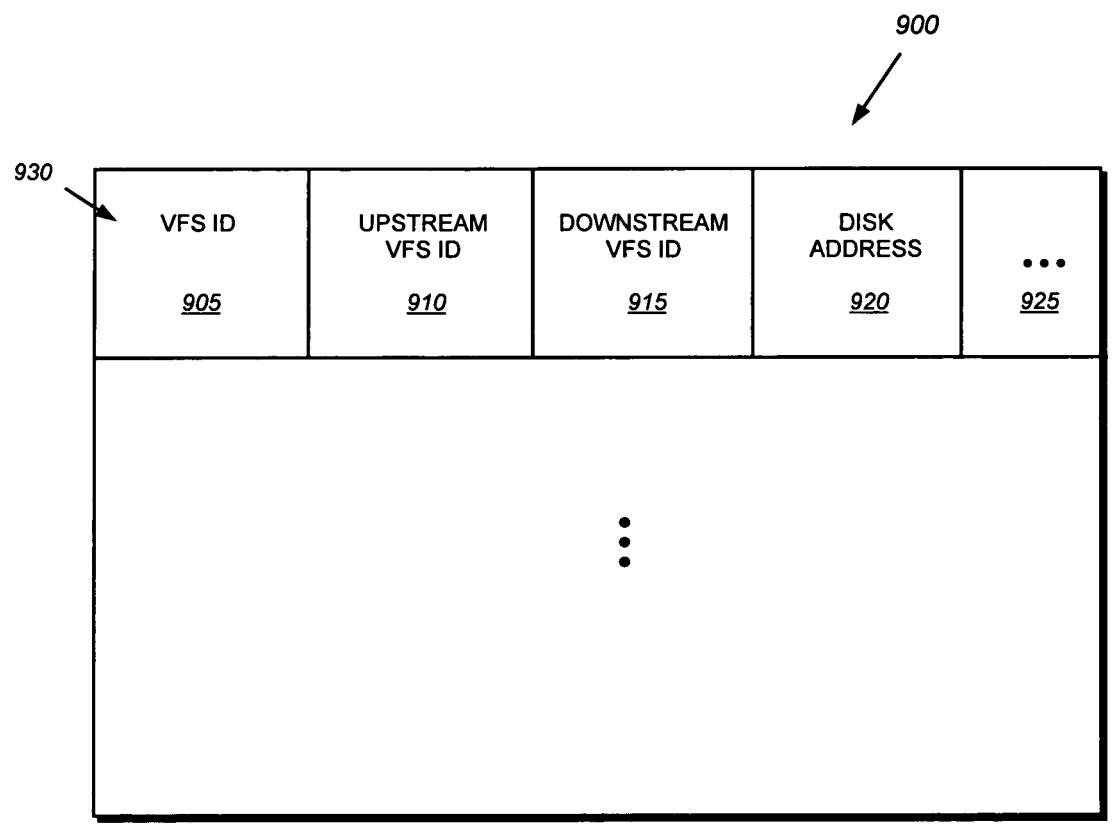
FIG. 9 is a schematic block diagram of an exemplary master volumes file in accordance with an embodiment of the present invention.

In the exemplary embodiment, the Spin FS file system is utilized. However, it should be noted that the principles of the present invention may be applied to any appropriate file system. The Spin FS file system maintains a master volumes file data structure for each storage pool. FIG. 9 is a schematic block diagram of an exemplary master volumes file data structure 900. As noted, each storage pool may have a plurality of VFS's associated therewith; the master volumes file data structure 900 is utilized to store various metadata associated with the various VFS's of the storage pool. The master volumes file data structure comprises a number of entries 930, each of which includes a VFS ID field 905, an upstream VFS ID field 910, a downstream VFS ID field 915, a disk address field 920 and, in alternate embodiments, additional fields 925. The VFS ID field 905 contains the VFS identifier for the VFS associated with the entry 930. As noted above, a VFS ID is an identifier of a VFS that is unique (global) within the entire cluster 100; however, it should be noted that mirrors of a VFS will share the same VFS ID.

The upstream and downstream VFS ID fields 910, 915 contain the VFS ID for the VFS that is either "upstream" (relies upon) or "downstream" (a clone of) from the specified VFS in field 905. In the exemplary embodiment, a read/write VFS, i.e., a VFS which is not a point in time image of another VFS, does not have an upstream VFS ID associated therewith as it is the "top" (root) of a tree of VFS's. A downstream VFS ID 915 identifies a VFS, that is a (hyper) clone of the VFS identified in field 905. The upstream VFS ID 910 identifies a VFS that relies upon the VFS identified in field 905. The disk address field 920 contains a pointer to the appropriate disk address within the storage pool for the VFS inode, described further below.

Figure 10:
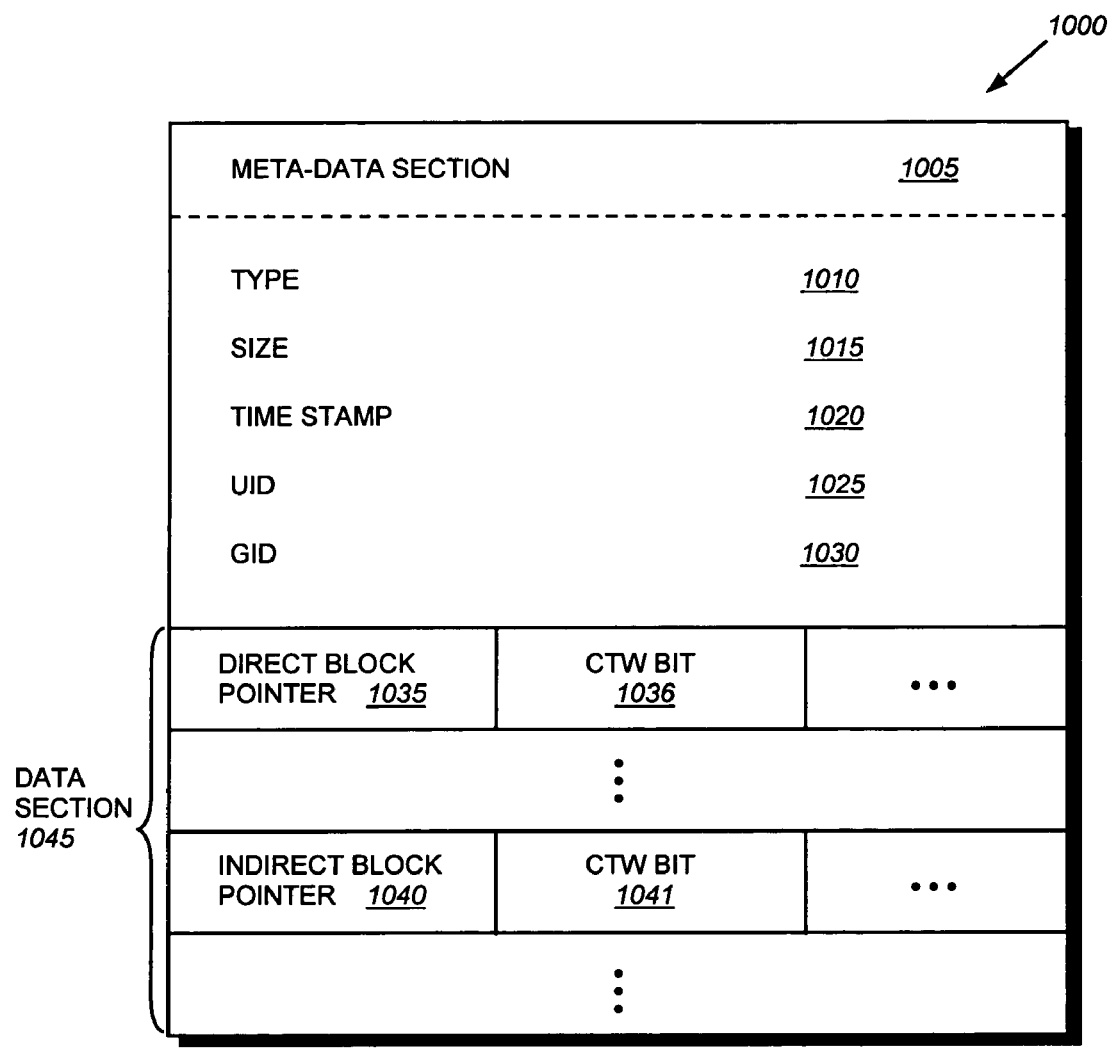
FIG. 10 is a schematic block diagram of an exemplary inode in accordance with an embodiment of the present invention.

In the illustrative embodiment, a VFS is represented in the file system by an inode data structure adapted for storage on disk. FIG. 10 is a schematic block diagram of an exemplary inode 1000 as used in an embodiment of the present invention. The inode 1000 includes a metadata section 1005 and a data section 1045. The information stored in the metadata section 1005 describes the VFS and, as such, includes the type 1010, size 1015, time stamps (e.g., access and/or modification) 1020 for the VFS, in addition to ownership information, i.e., user identifier (UID 1025) and group ID (GID 1030).

The data section 1045 of inode 1000 includes a plurality of direct block pointers 1035 and indirect block pointers 1040. Associated with each direct block pointer 1035 is a copy tree on write (CTW) bit 1036, indicates that the block should not be freed if this volume is modified and that the block cannot be modified directly through this volume. Instead, when attempting to modify this block, the file system first copies the block to a new location and modifies this new copy. The indirect block pointers 1040 contain pointers to indirect blocks, which in turn, reference data blocks containing inodes. Similarly, each indirect block pointer field 1040 has a CTW bit 1041 associated therewith. In the example of an indirect block with a CTW bit set, if the file system breaks the copy on write by, e.g., copying the indirect block to a new location and modifying the copy, the CTW bit must be propagated downwards into the indirect block. Thus, if a change is to be made to a block referenced by an indirect block, the indirect block is copied and clears the CTW bit in the indirect block pointer referencing the indirect block. All pointers within the indirect block have their CTW bit set. The CTW bits 1041, 1036 indicate whether the associated direct block or indirect blocks should be copied upon a write operation so that the original direct/indirect block remains in the file system. Thus, if a CTW bit is asserted for an indirect block pointer 1040, and thereafter the indirect block is modified, the file system will not free the indirect block when writing a new version of the block.

Figure 11:
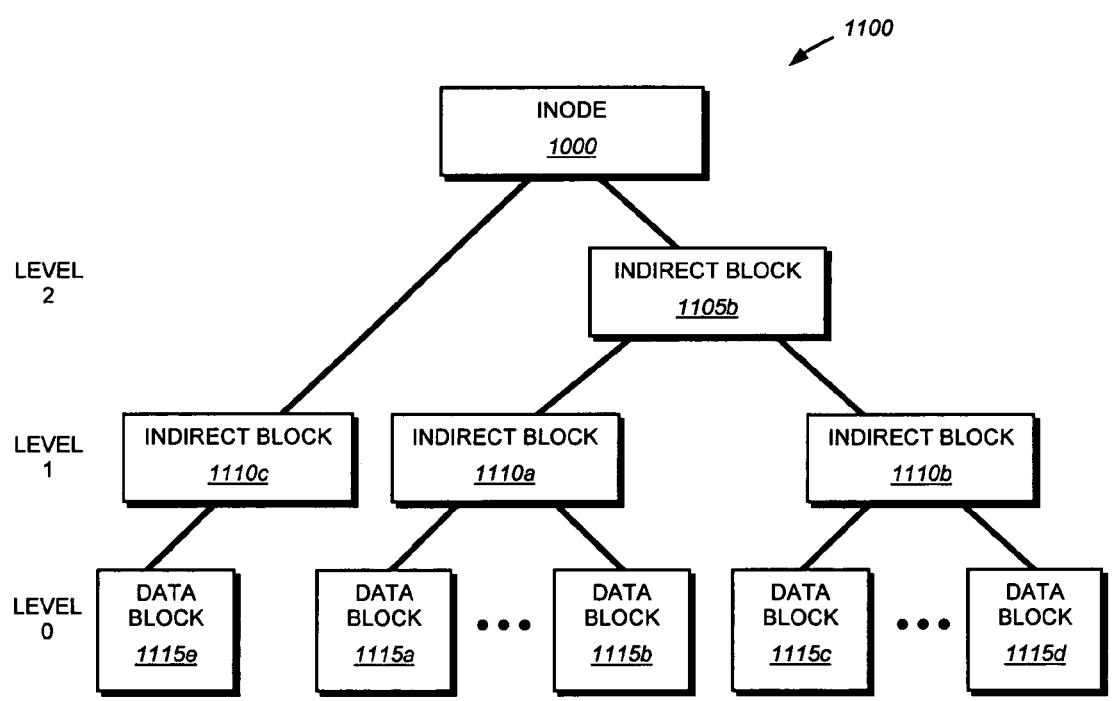
FIG. 11 is a schematic block diagram of an exemplary inode tree in accordance with an embodiment of the present invention.

FIG. 11 is a schematic block diagram of an exemplary inode buffer tree 1100 in accordance with an embodiment in the present invention. At the top (root) of the buffer tree 1100 of the VFS is an inode 1000, which may be stored within an inode file of the storage pool. The inode 1000 contains a series of indirect block pointers that points to indirect block 1105b and indirect block 1110c. Indirect block 1105, in turn, contains pointers to additional low-level indirect blocks 1110a,b. At the base of the VFS are individual data blocks 1115a-e. Each data block illustratively represents a 4 KB disk block. The data blocks are labeled as direct or level 0 (L0) blocks 1115, whereas indirect blocks that point directly to data blocks are labeled as level 1 (L1) blocks 1110. Similarly, indirect blocks that point to L1 blocks are level 2 (L2) blocks 1105. Buffer tree 1100 is illustratively representative of a VFS having an inode with two levels of indirect blocks (L1 and L2), pointing to data blocks; however, it should be noted that the principle of the present invention applies to VFS's having any number of indirect blocks. Two levels of indirect blocks are shown for illustrative purposes only and should not be taken as limiting the present invention. In the illustrative embodiment, each inode includes a pointer to a level 1 indirect block, a level 2 indirect block, a level 3 indirect block and a level 6 indirect block. Thus, for example, in the illustrative buffer tree 1100, inode 1000 points to a level 1 indirect block 1110c and a level 2 indirect block 1105b. However, as noted above, these pointers to various levels are exemplary only. In an alternate embodiment, an inode may contain a plurality of pointers to differing levels of indirect blocks.

G. Hypercloning a VFS

The present invention provides a technique for accelerating the creation of a point in time image (hereinafter "hyperclone") of a VFS within a storage pool. Since clients cannot typically access data during the creation of a conventional clone, the hyperclone technique shortens the "blackout" period for clients. To that end, the novel technique obviates the need to copy all indirect inodes and inodes of the inode file comprising the VFS. Instead of copying inodes associated with the VFS when creating the point-in-time representation, the novel hypercloning technique generates only a copy of a base VFS inode, which represents a top-level data structure of the base VFS. Data blocks that are directly referenced by the base VFS inode are also copied and direct block pointers within the copied (hyperclone) VFS inode are modified to reference the copied data blocks. Any indirect block pointers within the hyperclone VFS inode are not modified and, thus, continue to reference indirect blocks, which are now shared between the VFS and the hyperclone VFS.

Additionally, a flag in the copies of the indirect and direct blocks is asserted that alerts a file system executing in the storage system that the referenced indirect or direct block is not to be deallocated. This flag, which in the exemplary embodiment is a copy tree on write (CTW) bit, indicates that the associated data structure (direct or indirect block) is shared with one or more other VFS's within a storage pool of the system. Association of the CTW bit prevents the file system from freeing the direct/indirect block referenced by the inode and causes the file system to make a copy of the block before modifying the block. Thus, if a data block is modified, the file system writes a new block to disk and updates the pointer in the base VFS inode. The original data block continues to be referenced by the hyperclone VFS inode.

Figure 12:
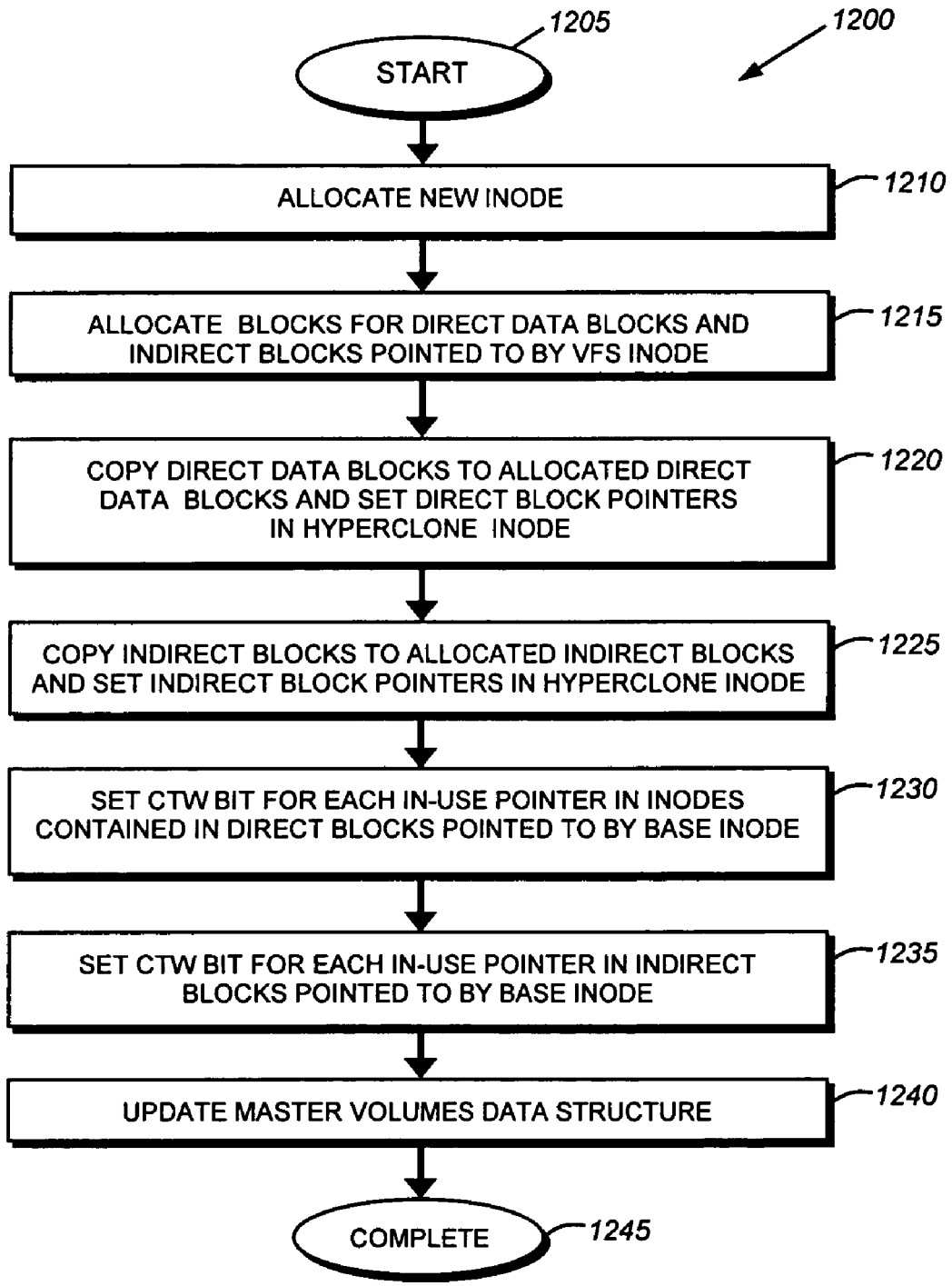
FIG. 12 is a flow chart detailing the steps of a procedure for generating a hyperclone of a VFS in accordance with an embodiment of the present invention.

FIG. 12 is a flowchart detailing the steps of procedure 1200 for generating a hyperclone of a VFS in accordance with an embodiment of the present invention. As noted, the hypercloning procedure is illustratively performed by the Bmap volume module 506. The procedure begins in step 1205 and continues to step 1210 where a new base VFS inode is allocated. This may be accomplished by, for example, designating the next free block in the storage pool, which is then assigned to the new base VFS inode. This allocation also copies and/or sets the appropriate metadata from the original base VFS inode. For example, the size metadata will be copied but the creation time metadata will be set to the appropriate time. In step 1215, blocks are allocated in the file system for the direct and indirect blocks pointed to by the VFS inode. Thus, if the VFS inode points to 20 blocks (e.g., 16 direct and 4 indirect), this step allocates 20 new blocks.

Then, in step 1220, the direct data blocks that are pointed to by the VFS inode are copied into the allocated blocks and the appropriate direct block pointers are set in the hyperclone inode. Once the data blocks have been copied, the procedure then, in step 1225, copies the indirect blocks pointed to by the base VFS inode to the remaining newly allocated blocks and sets the appropriate indirect block pointers in the hyperclone inode. Then, in step 1230, the CTW bit is set for each in-use pointer (i.e., one that is a non-zero value) in each inode contained in the data blocks pointed to by the base VFS inode. Similarly, in step 1235, the CTW bits are set for each in-use pointer in all indirect blocks pointed to by the base VFS inode. Then, in step 1240, the Bmap volume module inserts a new entry representing the hyperclone VFS into the master volumes file data structure 900 of the storage pool. The procedure then completes in step 1245. At the completion of procedure 1200, a new hyperclone VFS inode exists within the file system and points to copies of the direct and indirect blocks pointed to by the base VFS. Thus, no CTW bits are set in the base VFS inode itself, but are instead set in the blocks (direct and/or indirect) one level beneath the inode. However, it should be noted that in alternate embodiments, the CTW bits may be set in the inode.

Figure 13:
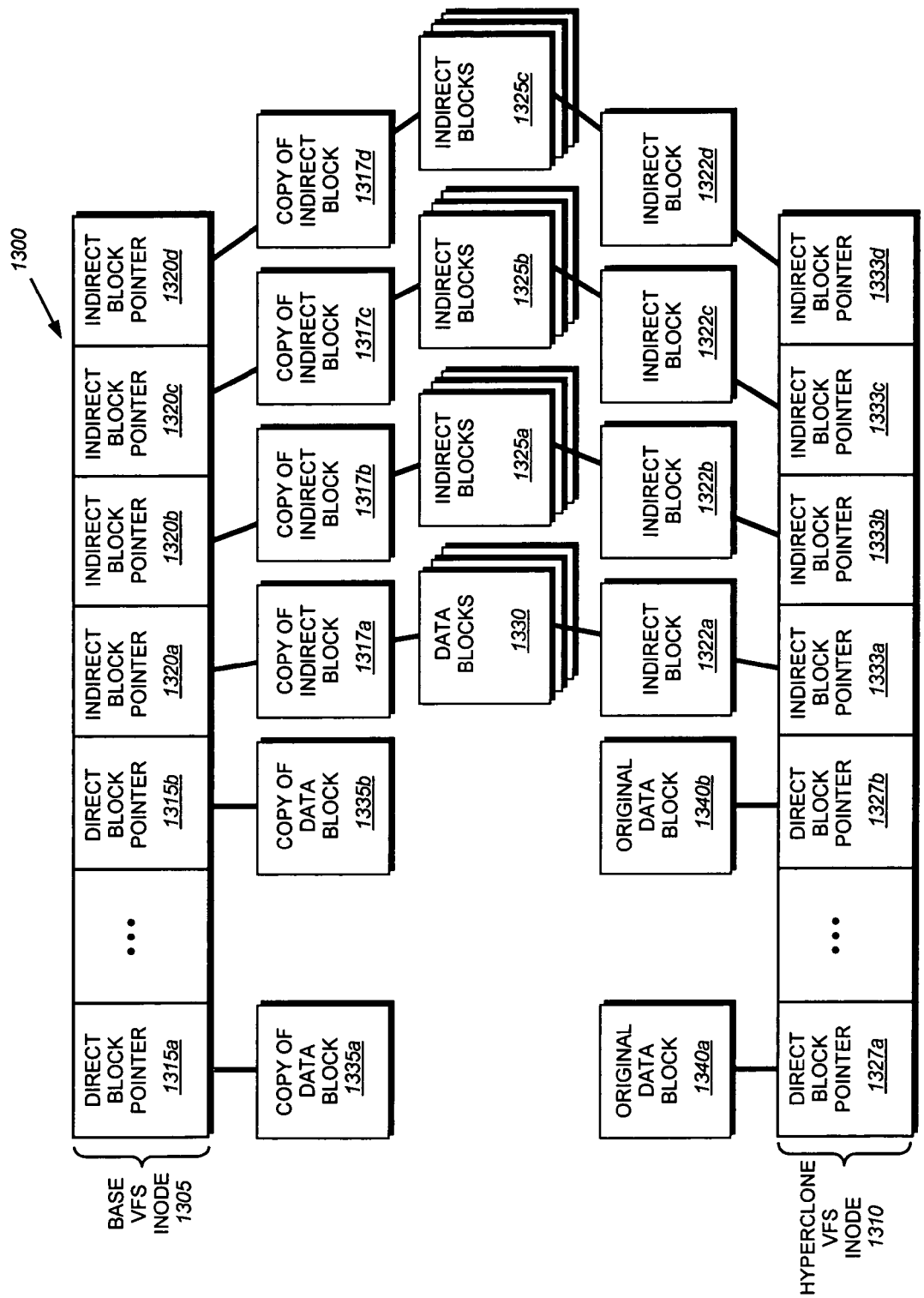
FIG. 13 is a schematic block diagram of an exemplary on-disk structure showing an original VFS and a hyperclone of the VFS in accordance with an embodiment of the present invention.

FIG. 13 is a schematic block diagram on an exemplary on-disk structure 1300 showing a base VFS inode 1305 and associated hyperclone VFS inode 1310 in accordance with an embodiment of the present invention. The on-disk structure 1300 results from the embodiment described above in reference to FIG. 12. The base VFS inode 1305 includes a plurality of direct block pointers 1315a, b, each of which points to a copy of a data block 1335a, b. The base VFS inode 1305 also includes a plurality of indirect block pointers 1320a, b, c, d, each of which references a copy of an indirect block 1317a, b, c, d. These indirect blocks, in turn point to indirect blocks 1325a,b,c and/or data blocks 1330. It should be noted that depending on the file system architecture, indirect blocks 1317 may point to additional indirect blocks, i.e., indirect blocks 1325 or may point to data blocks, i.e., data blocks 1330. In alternate embodiments, indirect blocks 1317 may point to all indirect blocks 1325 or may point to all data blocks 1330 or any combination thereof.

The hyperclone VFS inode 1310 includes a plurality of direct block pointers 1327a, b, each of which points to the original data blocks 1340a, b. The hyperclone VFS inode 1310 also includes a plurality of indirect block pointers 1333a, b, c, d, each of which points to an indirect block 1322a, b, c, d that comprises the base VFS. These indirect blocks 1322, in turn, contain pointers to indirect blocks 1325 and data blocks 1330. Thus, at the completion of the novel hypercloning process, the base VFS inode 1305 points to copies of the original direct data blocks 1335a,b and to indirect blocks 1317a,b,c,d, whereas the hyperclone VFS inode 1310 points to original data blocks 1340a,b, and also to indirect blocks 1322a,b,c,d. In this illustrative embodiment, the CTW bits will be set for all in-use pointers in the data blocks 1335a,b and also in indirect blocks 1317a,b,c,d. No CTW will be set in the base VFS inode 1305 in this illustrative embodiment.

To again summarize, the present invention provides a technique for accelerating the creation of a hyperclone of a VFS. The novel technique creates a hyperclone VFS inode and copies the direct data blocks from the base VFS inode. The direct data pointers in the hyperclone VFS inode reference the copied direct data blocks. The indirect data blocks of the hyperclone VFS inode point to the indirect data blocks.

In alternate embodiments of the present invention, the pointers that are not copied and have the CTW bit set may be varied without departing from the scope and spirit of the present invention. For example, in one alternate embodiment, no data blocks or indirect blocks may be copied and all block pointers (direct and indirect) may have the CTW bit set. In another embodiment, only a subset of the indirect block pointers will have the CTW bit set (and consequently not be copied). For example, if one buffer tree associated with an inode is substantially larger than other buffer trees, then the indirect block associated with that buffer tree may not be copied. As such, the description herein of only copying data blocks should be taken as exemplary only.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-blades, the teachings of the present invention are equally suitable to systems where the functionality of the N and D-blades are implemented in a single system. Alternately, the functions of the N and D-blades may be distributed among any number of separate systems wherein each system performs one or more of the functions. While the illustrative embodiment has been written in terms of VFS's it should be noted that any acceptable data container may be utilized in accordance with the principles of the present invention. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for generating a read only data container copy of a writeable data container, the method comprising:
   generating a read-only inode copy of a writeable top-level inode of the writeable data container, the read-only copy having block pointers to blocks directly referenced by the writeable top-level inode;
   generating a copy of the blocks directly referenced by the writeable top-level inode, hereinafter copied blocks;
   modifying block pointers of the writeable top-level inode to reference the copied blocks; and
   configuring a set of flags in the copied blocks to indicate that blocks referenced by the copied blocks are shared with blocks of a read-only data container copy.

2. The method of claim 1 wherein the writeable data container comprises a virtual file system.

3. The method of claim 1 wherein the set of flags comprise a copy tree on write (CTW) bit associated with each of the block pointers of the base inode.

4. The method of claim 1 wherein the blocks comprise indirect blocks and data blocks.

5. The method of claim 4 wherein the set of flags comprises a flag in each of the indirect blocks.

6. The method of claim 1 wherein the block pointers comprise indirect block pointers and direct block pointers.

7. The method of claim 1 further comprising inserting a new entry into a master volumes file, the new entry associated with the read only data container copy of the writeable data container.

8. The method of claim 7 wherein the entry comprises a data container ID field, an upstream data container ID field, a downstream data container ID field and a disk address field.

9. The method of claim 1 wherein the top-level inode is an inode file of the data container.

10. The method of claim 1 wherein the read-only inode copy is a top-level inode of the read-only data container copy.

11. A method for creating a hyperclone of a data container in a storage system, the method comprising:
    generating a copy of a base inode of the data container, the copied inode representing a new base inode;
    copying a set of direct data blocks referenced by the base inode of the data container;
    copying a set of indirect data blocks referenced by the base inode of the data container;
    configuring a set of direct block pointers in the base inode to reference the set of copied direct data blocks;
    configuring a set of indirect block pointers in the base inode to reference the set of copied indirect data blocks; and
    configuring a set of flags within blocks pointed to by the base inode of the data container signifying that a set of blocks referenced by the blocks pointed to by the base inode of the data container are shared with the hyperclone of the data container.

12. The method of claim 11 wherein the data container comprises a virtual file system.

13. The method of claim 11 wherein the set of flags comprise a copy tree on write (CTW) bit associated with each in-use pointer in the blocks pointed to by the base inode of the data container.

14. The method of claim 11 further comprising inserting a new entry into a master volumes file, the new entry associated with the hyperclone of the data container.

15. The method of claim 14 wherein the entry comprises a data container ID field, an upstream data container ID field, a downstream data container ID field and a disk address field.

16. A system for creating a hyperclone of a data container in a storage system, the system comprising:
    means for generating a copy of a base inode of the data container, the copied inode representing a new base inode;
    means for copying a set of direct data blocks referenced by the base inode of the data container;
    means for copying a set of indirect data blocks referenced by the base inode of the data container;
    means for configuring a set of direct block pointers in the base inode to reference the set of copied direct data blocks;
    means for configuring a set of indirect block pointers in the base inode to reference the set of copied indirect data blocks; and
    means for configuring a set of flags within blocks pointed to by the new base inode of the data container signifying that a set of blocks referenced by the blocks pointed to by the new base inode of the data container are shared with the hyperclone of the data container.

17. The system of claim 16 wherein the data container comprises a virtual file system.

18. The system of claim 16 wherein the set of flags comprise a copy tree on write (CTW) bit associated with each in-use pointer in the blocks pointed to by the base inode of the data container.

19. The system of claim 16 further comprising means for inserting a new entry into a master volumes file, the new entry associated with the hyperclone of the data container.

20. The system of claim 19 wherein the entry comprises a data container ID field, an upstream data container ID field, a downstream data container ID field and a disk address field.

21. A storage system comprising:
    a data container; and
    a module adapted to create a hyperclone of the data container by (i) allocating a new base inode, (ii) copying a set of blocks referenced by a base inode associated with the data container, (iii) configuring a set of block pointers in the base inode to reference the set of copied blocks, and (iv) configuring a set of flags within blocks referenced by the base inode signifying that blocks referenced by the blocks referenced by the base inode are shared between the hyperclone and the base data container.

22. The storage system of claim 21 wherein the module is further adapted to insert a new entry into a master volumes file, the new entry associated with the hyperclone of the data container.

23. The storage system of claim 22 wherein the entry comprises a data container ID field, an upstream data container ID field, a downstream data container ID field and a disk address field.

24. The storage system of claim 21 wherein the data container comprises a virtual file system.

25. A computer readable medium for creating a hyperclone of a data container in a storage system, the computer readable medium including program instructions for performing the steps of:
  generating a copy of a base inode of the data container, the copied inode representing a new base inode;
  copying a set of direct data blocks referenced by the base inode of the data container;
  copying a set of indirect data blocks referenced by the base inode of the data container;
  configuring a set of direct block pointers in the base inode to reference the set of copied direct data blocks;
  configuring a set of indirect block pointers in the base inode to reference the set of copied indirect data blocks; and
  configuring a set of flags within blocks pointed to by the base inode of the data container signifying that a set of blocks referenced by the blocks pointed to by the base inode of the data container are shared with the hyperclone of the data container.

26. The computer readable medium of claim 25 wherein the data container comprises a virtual file system.

27. The computer readable medium of claim 25 wherein the set of flags comprise a copy tree on write (CTW) bit associated with each in-use pointer in the blocks pointed to by the base inode of the data container.

28. The computer readable medium of claim 25 wherein the computer readable medium includes program instructions for further performing the step of inserting a new entry into a master volumes file, the new entry associated with the hyperclone of the data container.

29. The computer readable medium of claim 28 wherein the entry comprises a data container ID field, an upstream data container ID field, a downstream data container ID field and a disk address field.

30. A method for creating a hyperclone of a data container in a storage system, the method comprising:
  generating a copy of a base inode of the data container, the copy hereinafter a copied inode;
  copying a set of direct data blocks referenced by the base inode of the data container, the copy hereinafter copied direct data blocks;
  configuring a set of direct block pointers in the base inode to reference the set of copied direct data blocks;
  configuring a set of indirect block pointers in the copied inode to reference a set of indirect blocks referenced by the base inode; and
  configuring a set of flags within the base inode signifying that the set of indirect blocks are shared between the hyperclone and the data container.

31. The method of claim 30 wherein the data container comprises a virtual file system.

32. The method of claim 30 wherein the set of flags comprise a copy tree on write (CTW) bit associated with each of the indirect block pointers of the base inode.

33. The method of claim 30 further comprising inserting a new entry into a master volumes file, the new entry associated with the hyperclone of the data container.

34. The method of claim 33 wherein the entry comprises a data container ID field, an upstream data container ID field, a downstream data container ID field and a disk address field.

35. A system for creating a hyperclone of a data container in a storage system, the system comprising:
  means for generating a copy of a base inode of the data container, the copy hereinafter a copied inode;
  means for copying a set of direct data blocks referenced by the base inode of the data container, the copy hereinafter copied direct data blocks;
  means for configuring a set of direct block pointers in the base inode to reference the set of copied direct data blocks;
  means for configuring a set of indirect block pointers in the copied inode to point to a set of indirect blocks referenced by the base inode; and
  means for setting a set of flags within the base inode signifying that the set of indirect blocks are shared between the hyperclone and the data container.

36. The system of claim 35 wherein the data container comprises a virtual file system.

37. The system of claim 35 wherein the set of flags comprise a copy tree on write (CTW) bit associated with each of the indirect block pointers of the base inode.

38. The system of claim 35 further comprising means for inserting a new entry into a master volumes file, the new entry associated with the hyperclone of the data container.

39. The system of claim 38 wherein the entry comprises a data container ID field, an upstream data container ID field, a downstream data container ID field and a disk address field.

40. A storage system comprising:
  a data container; and
  a module adapted to create a hyperclone of the data container by (i) allocating a new inode, (ii) copying a set of data blocks referenced by a base inode associated with the data container, the copy hereinafter copied direct data blocks, (iii) configuring a set of direct block pointers in the base inode to reference the set of copied direct data blocks, (iv) configuring a set of indirect block pointers in the new inode to point to a set of indirect blocks referenced by the base inode, and (v) configuring a set of flags within the base inode signifying that the set of indirect blocks are shared between the hyperclone and the base data container.

41. The storage system of claim 40 wherein the module is further adapted to insert a new entry into a master volumes file, the new entry associated with the hyperclone of the data container.

42. The storage system of claim 41 wherein the entry comprises a data container ID field, an upstream data container ID field, a downstream data container ID field and a disk address field.

43. The storage system of claim 40 wherein the data container comprises a virtual file system.

44. A computer readable medium for creating a hyperclone of a data container in a storage system, the computer readable medium including program instructions for performing the steps of:
  generating a copy of a base inode of the data container, the copy hereinafter a copied inode;
  copying a set of direct data blocks referenced by the base inode of the data container, the copy hereinafter copied direct data blocks;
  configuring a set of direct block pointers in the base inode to reference the set of copied direct data blocks;
  configuring a set of indirect block pointers in the copied inode to reference a set of indirect blocks referenced by the base inode; and configuring a set of flags within the base inode signifying that the set of indirect blocks are shared between the hyperclone and the base data container.

45. The computer readable medium of claim 44 wherein the data container comprises a virtual file system.

46. The computer readable medium of claim 44 wherein the set of flags comprise a copy tree on write (CTW) bit associated with each of the indirect block pointers of the base inode.

47. The computer readable medium of claim 44 wherein the computer readable medium includes program instructions for further performing the step of inserting a new entry into a master volumes file, the new entry associated with the hyperclone of the data container.

48. The computer readable medium of claim 47 wherein the entry comprises a data container ID field, an upstream data container ID field, a downstream data container ID field and a disk address field.

49. A method for creating a hyperclone of a virtual file system (VFS) in a storage system, the method comprising:
   allocating a new inode, wherein the new inode includes a set of indirect block pointers referencing a set of indirect blocks shared with the VFS and wherein the new inode includes a set of direct block pointers referencing a set of copied direct data blocks; and
   setting a set of flags within a VFS inode signifying that the set of indirect blocks are shared between the VFS and the hyperclone.

50. A system for generating a read only data container copy of a writeable data container, the system comprising:
   means for generating a read-only inode copy of a writeable top-level inode of the writeable data container stored on a storage device, the read-only copy having block pointers to blocks directly referenced by the writeable top-level inode;
   means for generating a copy of the blocks directly referenced by the writeable top-level inode, hereinafter copied blocks;
   means for modifying block pointers of the writeable top-level inode to reference the copied blocks; and
   means for configuring a set of flags in the copied blocks to indicate that blocks referenced by the copied blocks are shared with blocks of a read-only data container copy.

51. A system, comprising:
   a writeable data container stored on a storage device, the writeable data container having a writeable top-level inode; and
   a module configured to generate a read only data container copy of a writeable data container, the module configured to: i) generate a read-only inode copy of the writeable top-level inode of the writeable data container, the read-only copy having block pointers to blocks directly referenced by the writeable top-level inode; ii) generate a copy of the blocks directly referenced by the writeable top-level inode, hereinafter copied blocks; iii) modify block pointers of the writeable top-level inode to reference the copied blocks; and iv) configure a set of flags in the copied blocks to indicate that blocks referenced by the copied blocks are shared with blocks of a read-only data container copy.

52. A method for generating a hyperclone, the method comprising:
   generating a first copy of only a top-level of an inode of a writeable data container, the first copy of the top-level of the inode having block pointers pointing to blocks directly referenced by the top-level of the inode;
   generating a second copy of only the blocks directly referenced by the top-level of the inode;
   modifying the block pointers of the top-level of the inode, which previously referenced the blocks directly referenced by the top-level of the inode, to now reference the second copy; and
   configuring a set of flags in the second copy to indicate that the blocks referenced by the second copy are shared with blocks of the top-level of the inode.

\* \* \* \* \*